UNITED STATES PATENT OFFICE.

GUSTAV J. GRUENDLER, OF ST. LOUIS, MISSOURI.

ADHESIVE.

SPECIFICATION forming part of Letters Patent No. 633,834, dated September 26, 1899.

Application filed May 18, 1898. Serial No. 681,079. (No specimens.)

*To all whom it may concern:*

Be it known that I, GUSTAV J. GRUENDLER, of the city of St. Louis, State of Missouri, have invented certain new and useful Improvements in Adhesive Compounds, of which the following is a full, clear, and exact description.

My composition consists of the following ingredients, combined in the proportions stated, viz: Schmierkase or Dutch cheese, one gallon; pulverized burnt lime, one pint. These ingredients are to be thoroughly mixed by stirring together or by being worked or kneaded. The schmierkase or Dutch cheese is a product that can usually be obtained at dairies and the like. This Dutch cheese is made from sour milk, and of course contains the customary proportion of lactic acid that forms an ingredient of the sour milk. When the two ingredients have been thoroughly commingled and kneaded or stirred to a consistency of ordinary molasses, it is placed in a suitable air-tight receptacle to be kept until used.

The union of the lactic acid and the lime form calcic lactate, which I have found makes a cement that is much more durable than if the Dutch cheese were displaced by ordinary casein or old dry cheese. Furthermore, I have found in practice that the Dutch cheese produces a cement that is more pliable and much more easily worked than if the Dutch cheese were displaced by old dry cheese. Old dry cheese is but slightly soluble in water, while Dutch cheese is much more soluble in water, and can therefore be much more easily and quickly worked.

The adhesive compound so formed is especially applicable for joining together ordinary earthen tile with wood or it may be used for other purposes, and when it is used it is applied directly to the surfaces of the tile and wood that are to be joined, and then said surfaces are brought together and held in any suitable manner until the compound hardens and becomes set. The compound enters or penetrates the pores of the wood and acts as a wood preservative, and said compound is perfectly waterproof and will not be affected by either heat or moisture.

The compound is to be used cold, and when stored in an air-tight receptacle it will keep for any length of time in any climate.

I claim—

The herein-described adhesive, consisting of the dairy product known as Dutch cheese containing the customary proportion of lactic acid, in combination with lime, substantially in the proportions herein specified.

In testimony whereof I affix my signature in presence of two witnesses.

GUSTAV J. GRUENDLER.

Witnesses:
 EDWARD E. LONGAN,
 M. P. SMITH.